United States Patent [19]

Volk

[11] Patent Number: 4,593,376

[45] Date of Patent: Jun. 3, 1986

[54] SYSTEM FOR VENDING PROGRAM CARTRIDGES WHICH HAVE CIRCUITRY FOR INHIBITING PROGRAM USAGE AFTER PRESET TIME INTERVAL EXPIRES

[76] Inventor: Larry N. Volk, 3320 Royce Ct., Las Vegas, Nev.

[21] Appl. No.: 487,018

[22] Filed: Apr. 21, 1983

[51] Int. Cl.⁴ .................... G06F 13/00; G06F 15/44
[52] U.S. Cl. ................... 364/900; 273/85 G; 273/DIG. 28; 273/148 B; 365/52; 365/63; 364/479
[58] Field of Search ... 364/200 MS File, 900 MS File, 364/478, 479; 365/52, 63; 358/114–117; 273/DIG. 28, 85 G, 148 B; 194/1 R, DIG. 11; 360/15

[56] References Cited

U.S. PATENT DOCUMENTS

| | | | |
|---|---|---|---|
| 2,568,734 | 9/1951 | Heyer | 88/18.7 |
| 3,081,668 | 3/1963 | Nistri | 88/16.2 |
| 3,139,788 | 7/1964 | Hughes et al. | 88/17 |
| 3,620,476 | 11/1971 | Cervantes | 242/197 |
| 3,646,258 | 2/1972 | Lemelson | 360/92 |
| 3,718,906 | 2/1973 | Lightner | 360/15 X |
| 3,947,882 | 3/1976 | Lightner | 360/92 |
| 4,078,643 | 3/1978 | Warthan et al. | 194/15 |
| 4,115,662 | 9/1978 | Guinet et al. | 179/15 BV |
| 4,133,013 | 1/1979 | Fisher | 360/92 |
| 4,168,396 | 9/1979 | Best | 178/22.09 |
| 4,247,106 | 1/1981 | Jeffers | 273/85 G |
| 4,300,040 | 11/1981 | Gould et al. | 235/381 |
| 4,325,078 | 4/1982 | Seaton et al. | 358/117 |
| 4,335,809 | 6/1982 | Wain | 194/1 R |
| 4,352,011 | 9/1982 | Guillou | 235/375 |
| 4,414,467 | 11/1983 | Gould et al. | 235/381 |
| 4,439,785 | 3/1984 | Leonard | 358/120 |
| 4,471,163 | 9/1984 | Donald et al. | 178/22.08 |
| 4,484,217 | 11/1984 | Block et al. | 358/84 |
| 4,509,210 | 4/1985 | Kohn | 455/349 |
| 4,516,777 | 5/1985 | Nikora | 273/148 B |
| 4,528,643 | 7/1985 | Freeny, Jr. | 364/900 |
| 4,550,350 | 10/1985 | Billings | 360/15 |

OTHER PUBLICATIONS

Stephen W. Fields, "E-Prom Cartridges Change the Action in Games People Play"; Electronics Review/-May 31, 1983, pp. 49-50.

Arnie Katz, "What Mother Bell Never Told Us About Fun on the Telephone"; Electronic Games, pp. 32-36.

*Primary Examiner*—Harvey E. Springborn
*Assistant Examiner*—A. Williams
*Attorney, Agent, or Firm*—Barry E. Sammons

[57] ABSTRACT

A vending machine stores a plurality of video game programs which may be selected for purchase. The game program is transferred to a programmable cartridge which the user inserts into the machine. The programmable cartridge is then removed for use on a separate video game unit. The programmable cartridge includes a use interval circuit which is preset by the vending machine to expire after a time interval. When expired, the transferred program is rendered inoperable.

18 Claims, 12 Drawing Figures

FIG.6A
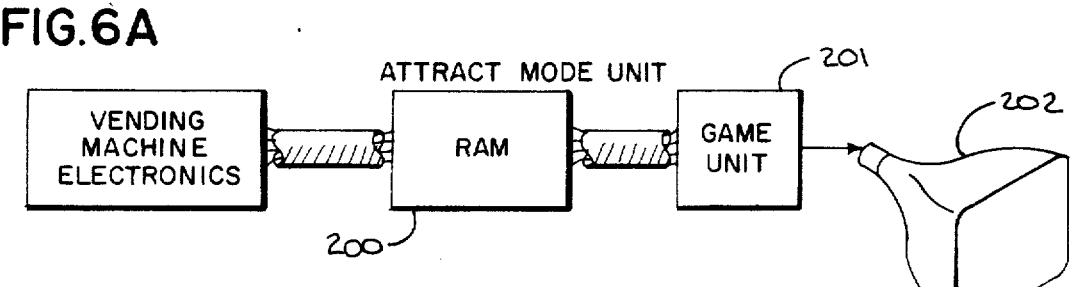
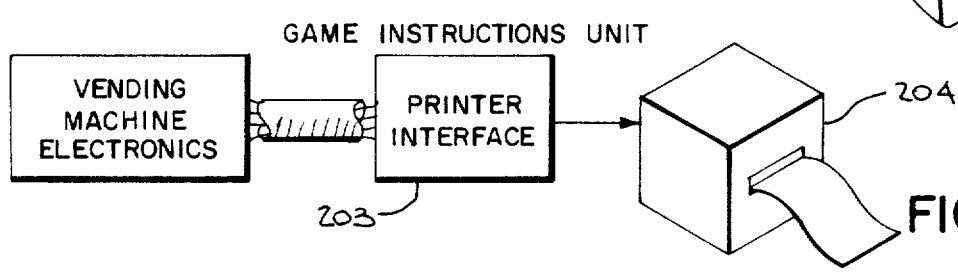
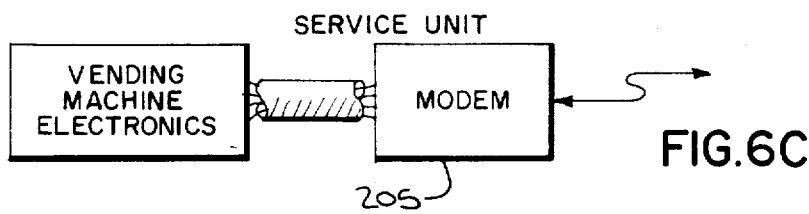
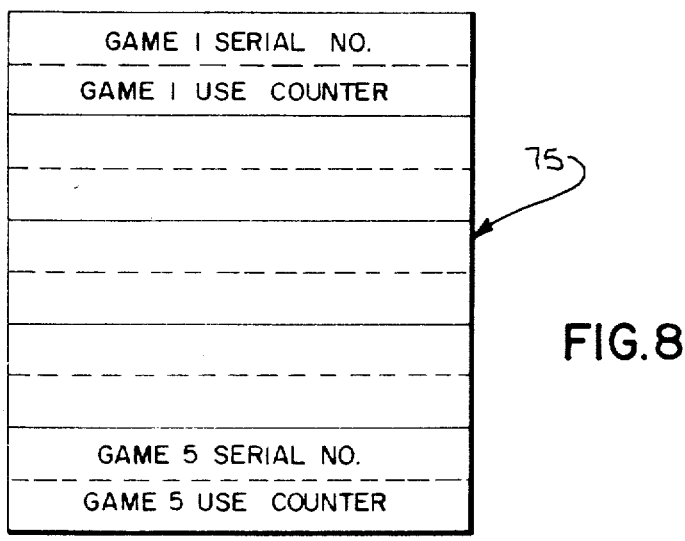
FIG.8

SYSTEM FOR VENDING PROGRAM CARTRIDGES WHICH HAVE CIRCUITRY FOR INHIBITING PROGRAM USAGE AFTER PRESET TIME INTERVAL EXPIRES

BACKGROUND OF THE INVENTION

The field of the invention is home video games and personal computers which receive removable cartridges that contain programs stored on non-volatile memory devices.

Home video games and many personal computers have a connector into which a program cartridge can be inserted. The program cartridge contains a program for operating the video game unit or personal computer and it is typically stored in a non-volatile memory device such as a mask programmable ROM. The program cartridges are mass produced and sold to the end user through retail outlets.

The sales price of program cartridges far exceeds the cost of their manufacture. One of the major reasons for this high price is the cost of developing the program or the cost of purchasing the rights in an existing program. In addition, as with the production of recordings and motion pictures, only a small fraction of the programs which are marketed are highly successful, and the profits on these must offset the losses on the unsuccessful productions.

A number of techniques are available to reduce the price charged to the user for a program. For example, the program cartridges may be rented for a time period as is commonly done with video cassette recordings of motion pictures. When the rental period expires, the user returns the program cartridge to the retailer. Another approach is disclosed in U.S. Pat. No. 4,247,106 in which a receiver of program material is connected to a CATV or MATV cable network. A selected program is "downloaded" to the receiver and stored in a volatile RAM memory which is used to operate the video game unit or personal computer. The user is charged for the use of the program while it is maintained in the receiver.

SUMMARY OF THE INVENTION

The present invention relates to a system for vending programs, and particularly, to a program cartridge which maintains a program for a preset use interval and which may be reprogrammed. The system includes a vending machine which includes means for storing one or more program, means for transferring a selected program to the programmable program cartridge, and means for establishing the use interval of the selected program. The program cartridge may be disconnected from the program vending machine and used in a conventional manner in a separate programmable unit such as a personal computer or video game unit. When the use interval expires, the program stored in the cartridge becomes inoperable and the user returns to the vending machine for another program and use interval.

A general object of the invention is to provide a program cartridge which stores an operable program for a preset use interval. The program cartridge contains a non-volatile memory which is electrically programmable by the vending machine. A use interval circuit couples to this memory and is preset to a selected use interval by the vending machine. When the cartridge is employed by the user in the video game unit or personal computer, the stored program instructions are read from the cartridge memory in normal fashion and executed to perform the program functions. When the use interval expires the cartridge memory is rendered inoperable by the use interval circuit. The program cartridge must then be reconnected to the program vending machine to again preset the use interval circuit.

Another object of the invention is to provide a program vending machine. The vending machine may store a selection of programs suitable for transfer to the program cartridge memory. The user makes a selection and this program is electrically transferred to the cartridge memory. In addition, the vending machine presets the use interval circuit in the program cartridge to place a limit on the use of the transferred program. In the preferred embodiment of the invention the vending machine is coin operated and the amount of money inserted in the machine can determine the length of the use interval.

A more specific object of the invention is to provide a program cartridge which does not require a continuous source of electrical power, but which is easily reprogrammable by the vending machine. An electrically alterable read-only memory (EAROM) is used for this purpose. It provides nonvolatile storage for the program transferred from the vending machine, and it may thus be disconnected from the vending machine and transported by the user without the need for a separate power supply or batteries. In addition, the EAROM memory may be easily reprogrammed when the program cartridge is reinserted in the vending machine by merely electrically transferring another program to the cartridge.

Another more specific object of the invention is to provide a program vending machine which enables efficient distribution of software. The vending machine includes a processor for acquiring and storing data on the usage of each program which it dispenses. Such data may be periodically read out of the vending machine and employed to generate accounting reports. Such accounting reports may be employed to determine the compensation due the various segments of the distribution system and the program copyright owners. These accounting reports may also be employed to provide marketing statistics on each vending machine and on each program. Such information enables both the vending machines and the programs to be efficiently used and distributed.

Another object of the invention is to provide a program vending machine which protects both the users and the program owners. When the program cartridge is inserted into the vending machine, the integrity of the cartridge memory and the use interval circuit is checked to insure proper operation. Only then is the user's money accepted and the selected program transferred to the program cartridge.

Another specific object of the invention is to provide a vending machine which promotes the sale of programs. The vending machine may include a processor and display which enables the programs to be executed. For example, when video game programs are dispensed the vending machine processor may execute the "attract mode" portion of each program to provide the user with an indication of the nature of the game. Also, the game instructions may be displayed to the user when he selects a game.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 6A is a block diagram of a second embodiment of the invention which employs an attract mode unit;

FIG. 6B is a block diagram of a third embodiment of the invention which employs a game instruction unit;

FIG. 6C is a block diagram of a third embodiment of the invention which employs a service unit;

FIG. 8 is a schematic representation of an accounting table which is stored in a RAM memory that forms part of the system of FIG. 4.

DESCRIPTION OF THE PREFERRED EMBODIMENT

Figure 1:
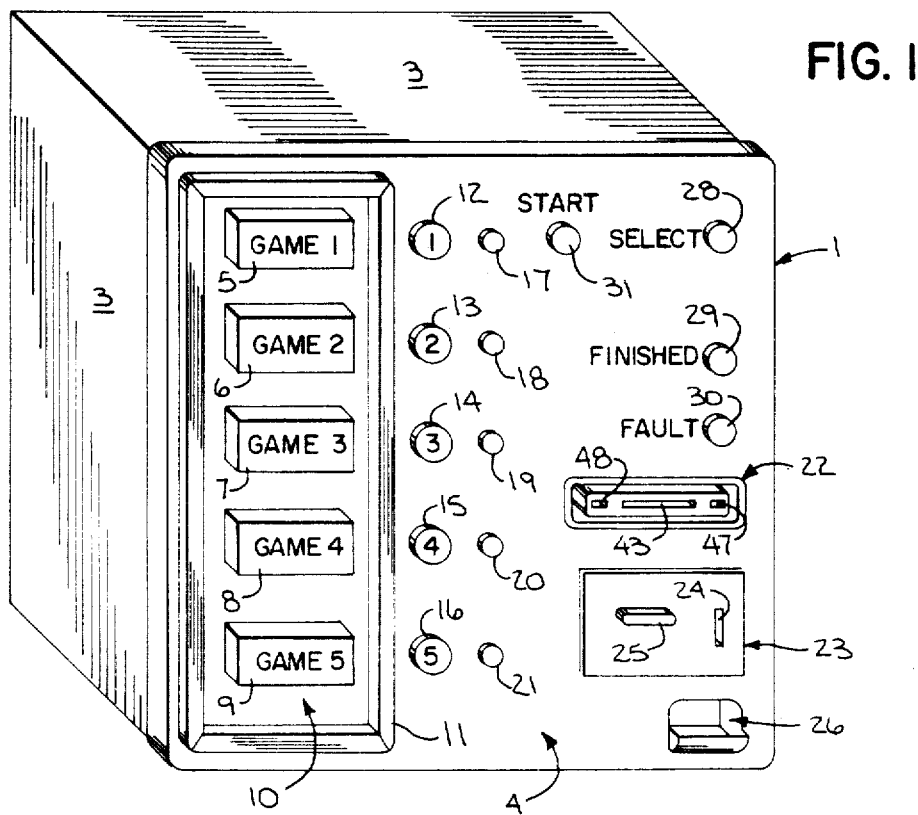
FIG. 1 is a perspective view of a vending machine which incorporates the present invention.
Figure 2:
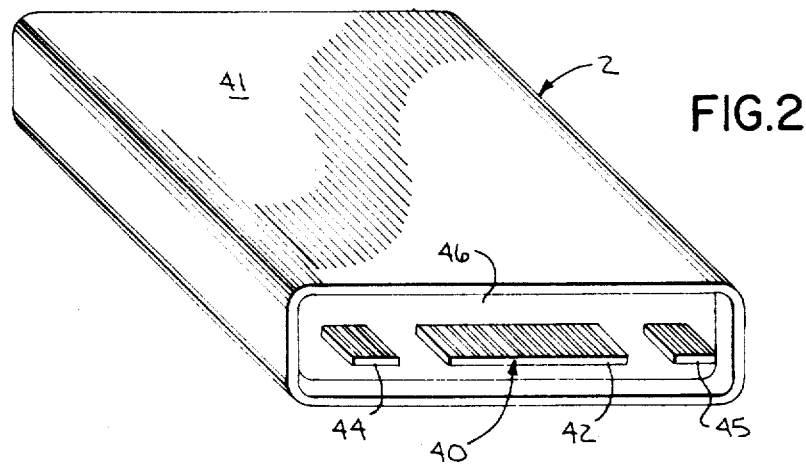
FIG. 2 is a perspective view of a programmable cartridge which is employed with the vending machine of FIG. 1.

Referring particularly to FIGS. 1 and 2, the program vending system is comprised of two separate elements; a vending machine 1; and a program cartridge 2. The vending machine 1 is contained within a rectangular housing 3 which has a front panel 4 that is hinged along one side. The electronics which perform the vending machine functions are contained within the housing 3 and the input and output devices which interface the vending machine to the user are mounted to the front panel 4.

Exposed through a rectangular window 11 in the front panel 4 are five game cartridges 5–9 which are mounted within a recessed area 10. When the hinged front panel 4 is swung open, the game cartridges 5–9 are accessible to the vending machine operator and they may be replaced with other similar game cartridges. The game cartridges 5–9 are conventional cartridges which store programs in read-only memory devices and which are suitable for use on commercially available video game units. The cartridges 5–9 are labeled along their front edge to enable the user to identify the game program contained therein.

A set of pushbutton switches 12–16 are mounted alongside the window 11 to enable the user to select one of the game programs 5–9. When a switch 12–16 is depressed, a corresponding indicator lamp 17–21 is energized to confirm the selection.

A user connector 22 is mounted to the front panel 4 immediately above a coin mechanism 23. The user connector 22 is physically compatible with the programmable cartridge 2, and hence, it is virtually identical to the connector on the video game unit in which the cartridge 2 is used. The coin mechanism 23 is a commercially available unit which receives quarters in a slot 24 and which provides a switch closure when the required number have been inserted. A coin return lever 25 may be manually operated, and quarters are returned to a discharge chute 26. As will be described in more detail below, the money is also returned by the coin mechanism 23 when it receives an electrical signal from the vending machine circuit.

A set of lamps 27–30 provide the user with an indication of the sequence in which the vending machine 1 is operated. The "select" lamp 28 is energized when the user depresses a "START" pushbutton switch 31. The user is then free to select one of the five game programs 5–9. As explained above, this is accomplished by depressing an appropriate pushbutton switch 12–16. As will be explained in more detail below, the vending machine circuit checks the integrity of the programmable cartridge 2 which has been inserted into the connector 22. If the cartridge 2 is operating properly, the selected game program is transferred to the cartridge memory and the "finished" lamp 29 is energized. If the programmable cartridge 2 is not operating properly, however, the "Fault" lamp 30 is energized and the user's money is returned at the discharge chute 26. The sequence can then be repeated by depressing the "start" pushbutton 31.

Referring particularly to FIGS. 1 and 2, the programmable cartridge 2 includes a printed circuit board 40 which is contained within a molded plastic case 41. The edge of the circuit board 40 extends through the end 46 of the case 41 to form an edge connector 42 that provides electrical connection with the electronics in the game unit. The edge connector 42 is received in a slot 43 formed in the user connector 22 on the vending machine 1, and electrical connection is thus made for the address leads, data leads, power supply leads and control lines. In addition, two tabs 44 and 45 extend through the end wall 46 on each side of the edge connector 42. The tabs 44 and 45 serve to guide the edge connector 42 into the slot 43, and they operate a shutter mechanism (not shown) which blocks the slot 43 when the cartridge 2 is not plugged into the vending machine 1. A similar shutter mechanism is employed on the game unit which the programmable cartridge 2 operates, and the tabs 44 and 45 serve to open this shutter as well when the cartridge 2 is inserted. In addition, each tab 44 and 45 supports two conductive pads which make electrical connections to the vending machine circuitry. These connections are made when the tabs 44 and 45 extend through mating slots 47 and 48 in the user connector 22.

Figure 3:
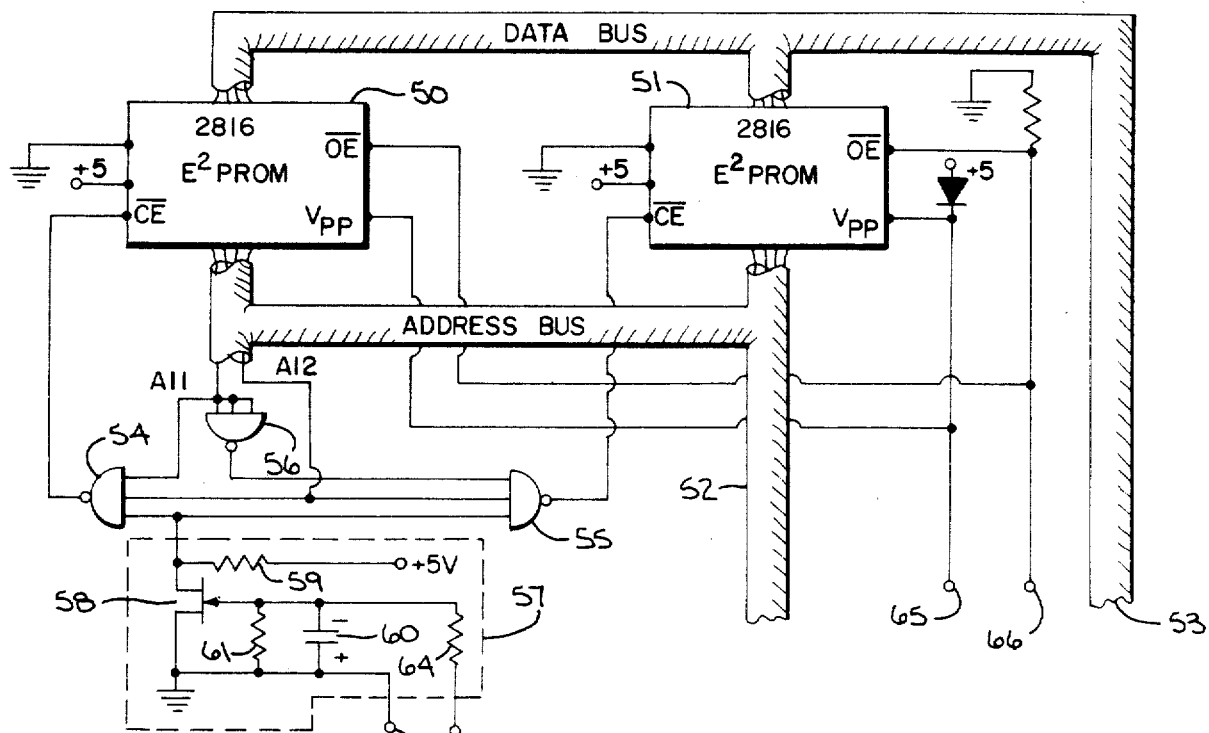
FIG. 3 is an electrical schematic diagram of the programmable cartridge of FIG. 2.

Referring particularly to FIG. 3, the programmable cartridge 2 contains a reprogrammable non-volatile memory in the form of two 2Kx8 electrically erasable programmable read-only memories (E$^2$PROM) 50 and 51. E$^2$PROMs manufactured by Intel, Inc. as the serial number 2816 are preferred, although memories available from other manufacturers are also suitable for the purpose. The leads A0–A10 in an address bus 52 connect to address terminals on the E$^2$PROMs 50 and 51 and leads D0–D7 in a data bus 53 connect to eight input/output terminals on the E$^2$PROMs 50 and 51. The leads A0–A12 in the address bus 52 and the leads D0–7 in the data bus 53 are brought out to the edge connector 42 where they connect with corresponding leads in the vending machine 1 or the video game unit. Signal ground and the +5 volt supply voltage leads are similarly brought out to the edge connector 42 where they connect to the power supply in either the vending machine 1 or the video game unit.

During normal operation in a video game unit, program instructions are read from the E²PROMs 50 or 51 and executed. The memory device is selected by the signals on address bus leads A11 and A12 and a particular line in the selected memory device is addressed by the signals on address leads A0–A10. A chip enable terminal (CE) on E²PROM 50 is driven by a first NAND gate 54 and the chip enable terminal (CE) on E²PROM 51 is driven by a second NAND gate 55. Two inputs on each NAND gate 54 and 55 are driven by address leads A11 and A12. The A11 input to NAND gate 55 is inverted by a NAND gate 56 so that the logic level of address lead A11 determines which of the two E²PROMs 50 or 51 is selected.

Neither E²PROM 50 or 51 may be enabled if a third input to each NAND gate 54 and 55 is at a logic low level. These third inputs are controlled by a use interval circuit 57 which contains an electronic switch 58 that connects to circuit ground. When the switch 58 is closed, the NAND gates 54 and 55 are disabled and the E²PROMs 50 and 51 cannot be enabled. The programs stored therein cannot be accessed and the programmable cartridge 2 becomes inoperable to the user.

The electronic switch 58 is a field effect transistor (FET) which is turned off when its gate is below a negative threshold voltage (approximately −5 volts). When turned off, a pull-up resistor 59 raises the third inputs on NAND gates 54 and 55 to a logic high voltage. Both E²PROMs 50 and 51 may then be accessed. The switch voltage on the gate is determined by the charge on a timing capacitor 60. The timing capacitor 60 is charged by the vending machine 1 to produce a negative voltage and this charge is slowly dissipated through a discharge resistor 61. A pair of charging terminals 62 and 63 connect to the capacitor 60 through a protective resistor 64, and these terminals 62 and 63 are brought out of the case 41 on opposite surfaces of the tab 44.

When the programmable cartridge 2 is plugged into the vending machine 1, a program is transferred to the E²PROMs 50 and 51 and the use interval circuit is preset to a selected time. The use interval time is determined by the values of the capacitor 60 and resistor 61 and by the amount of negative charge which the vending machine 1 applies to the terminals 62 and 63. For a time interval of one week, for example, a resistor value of 470 megohms, a capacitor value of 4700 microfarads and a charging voltage of −12 volts provides a sufficiently accurate time interval.

To reprogram the E²PROMs 50 and 51 two control lines 65 and 66 must be operated by the vending machine 1. These control lines 65 and 66 are brought outside the case 41 on opposite surfaces of the tab 45. The control line 66 connects to the output enable terminal (OE) on each E²PROM 50 and 51, and when it is at a logic low voltage program instructions may be read from an addressed memory location. When the control line 66 is at a logic high voltage, the E²PROMs 50 and 51 can be erased or reprogrammed. This is accomplished by applying a 21 volt programming pulse to the control line 65 which connects to the Vpp terminal on each E²PROM 50 and 51. A detailed description of the erase mode and write mode of operation for the E²PROMs 50 and 51 is provided in "Application Note AP-101" published in April, 1981, by Intel, Inc.

It should be apparent that many variations are possible in the programmable cartridge construction. Other memory devices may be employed which require different programming and erasure sequences. Also, the use interval circuit herein measures time by discharging a capacitor, but a digital clock circuit could be employed if a sufficient power source is provided in the cartridge. Also, the use interval may be measured by counting the number of times the cartridge is used, rather than the elapsed time.

Figure 4:
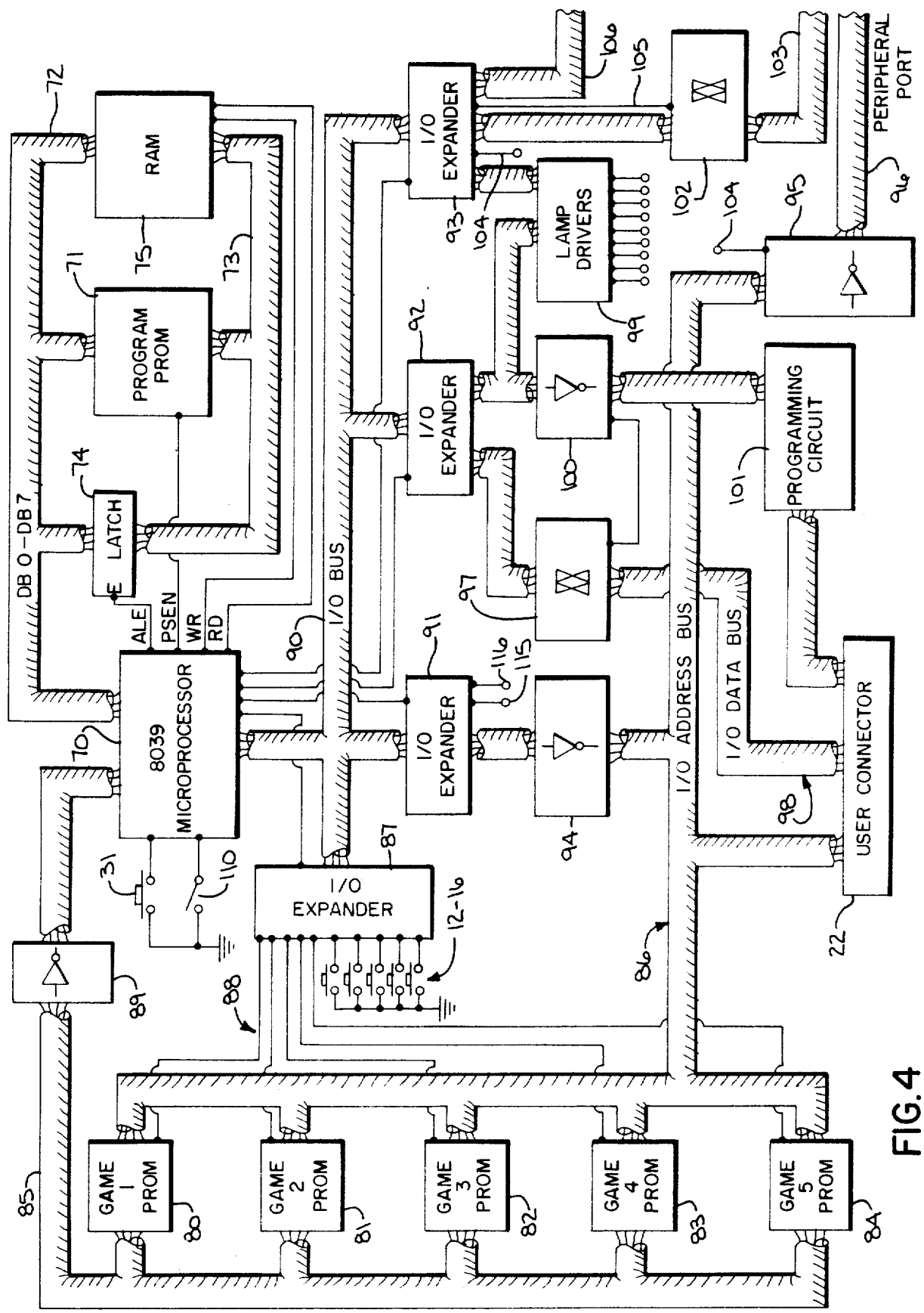
FIG. 4 is an electrical schematic diagram of the vending machine of FIG. 1.

Referring particularly to FIG. 4, the vending machine's electronic circuit is structured about an 8-bit microprocessor 70. The microprocessor 70 executes program instructions stored in a program PROM 71 to carry out the various vending machine functions. The program PROM 71 is coupled to the microprocessor 70 through a data bus 72, and a program instruction therein is selected by the address on a bus 73 which is driven by a latch 74. This address is output from the program counter in the microprocessor 70 to the latch 74 when an ALE control line is active, and the addressed instruction is read from the PROM 71 when a PSEN control line is active. A random access memory (RAM) 75 also connects to the buses 72 and 73 and data may be read from or written to the RAM 75 when control lines RD or WR are active.

The game cartridges 5–9 contain programmable read-only memories (PROM) 80–84 which store the game programs. The data terminals on these PROMs 80–84 connect to the leads in a data input bus 85, and their address terminals connect to the leads in an I/O address bus 86. An I/O expander circuit 87 has five output terminals which selectively drive the chip enable lines 88 for the PROMs 80–84, and the five game select pushbutton switches 12–16 connect to input terminals on the expander circuit 87. Data from an addressed line in a selected game PROM 80–84 is input to the microprocessor through a set of gates 89. The I/O expander 87 connects to the microprocessor 70 through an I/O bus 90, and the state of the selector switches 12–16 may be examined by inputting data from the I/0 expander 87. Similarly, data may be output through thoe I/O bus 90 to the I/O expander 87 to select the game PROM 80–84 which is to be enabled. An 8243 input/output expander circuit manufactured by Intel, Inc. is employed as the circuit 87, and its operation is fully described in the "Component Data Catalog" published in 1981 by Intel, Inc.

Three additional I/O expander circuits 91–93 interface the remainder of the vending machine circuit to the microprocessor 70. The I/O expander 91 receives sixteen bits of data from the microprocessor 70 and outputs thirteen of these to the I/O address bus 86 through gates 94. The I/O address bus 86 not only addresses lines in the game PROMs 80–84, but it also drives the address leads A0–A12 in the programmable cartridge 2 attached to the user connector 22. In addition, the I/O address bus 86 connects to a set of tri-state gates 95 which drive a peripheral bus 96.

Two additional terminals 115 and 116 on the I/O expander circuit 91 connect to the coin mechanism 23. The terminal 115 is an input terminal which receives a logic level signal which indicates that the proper amount of money has been deposited in the machine. The other terminal 116 generates a logic level signal to the coin mechanism 23 when it is to return the deposited money to the user.

The I/O expander 92 serves a number of functions. Eight of its terminals connect to a set of bidirectional gates 97 which in turn connect to an I/O data bus 98. The bus 98 connects to the leads D0–D7 in the programmable cartridge 2 through user connector 22, and 8-bit bytes of data may be either input from or output to the programmable cartridge 2 through this I/O data bus 98.

The I/O expander 92 also provides output from the microprocessor 70 to a set of lamp driver circuits 99 and a set of inverter gates 100. The lamp drivers 99 connect to the indicator lamps 17–21 and 28–30 on the front panel 4, and the operation of each lamp may thus be controlled by the program which is executed by the microprocessor 70. The inverter gates 100 connect to and drive a programming circuit 101. As will be explained in more detail below, the programming circuit 101 produces the pulses required to erase and reprogram the $E^2PROMs$ in the programmable cartridge 2 inserted in the user connector 22. The operation of this circuit 101 is, therefore, under the control of the program executed by the microprocessor 70.

The fourth I/O expander 93 operates a few of the lamp drivers 99, but one of its primary functions is to interface with the peripheral port. More specifically, eight of its terminals connect through bi-directional data gates 102 to a peripheral data bus 103. One output 104 drives the enable terminal on the tri-state gates 95, and another output 105 drives the data direction terminal on the gates 102. Because a variety of peripheral devices can be attached to the peripheral port, the remaining terminals on the I/O expander 93 are employed as general purpose control lines 106.

The vending machine operates in two modes; run and service. A service switch 110 determines the mode of operation and its state is read through a microprocessor input terminal T1. The start pushbutton 31 connects to another input terminal T0, and as will be described in more detail below, the microprocessor 70 begins a sequence of operations when the start switch 31 is closed.

Figure 5:
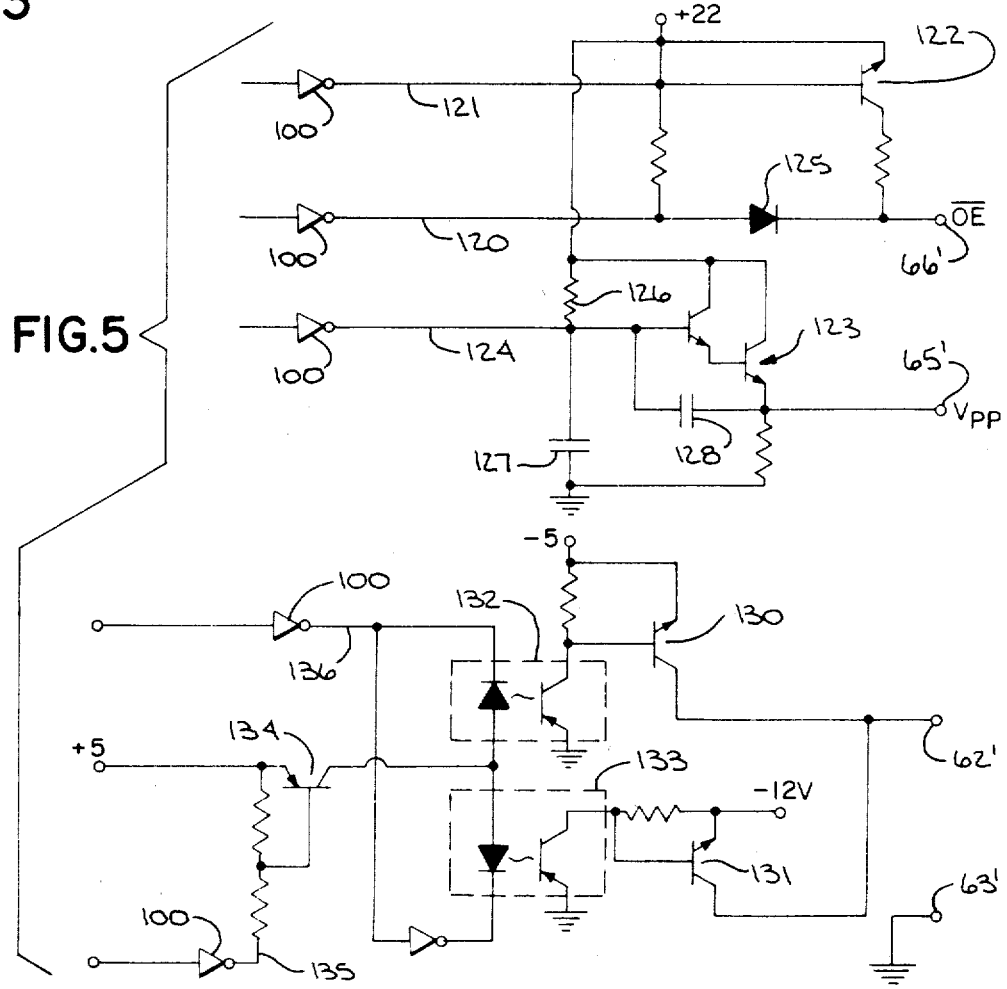
FIG. 5 is an electrical schematic diagram of the programming circuit which forms part of the diagram of FIG. 4.

Referring particularly to FIGS. 3 and 5, the programming circuit 101 is comprised of three separately operable sections which are controlled by five of the inverter gates 100. The first section drives an output enable line 66' which connects with the line 66 in the programmable cartridge 2. An input 120 connects directly to the output enable line 66' through a diode 125 and it is driven between a logic high voltage and a logic low voltage by a gate 100. A second input 121 drives the base of an NPN transistor 122 which connects to a +22 volt power supply, and when the input 121 is at a logic low level, the transistor 122 is driven into conduction to apply 12 volts to the output enable line 66'. This higher voltage level is employed to erase an entire $E^2PROM$ 50 or 51 in a single ten millisecond pulse.

The second section of the programming circuit 101 includes a Darlington transistor pair 123 which is driven through an input 124. The transistor pair 123 connects to the +22 volt power supply, and when the input 124 is driven to a logic high voltage, a 21 volt pulse is applied to the Vpp control line 65'. Resistor 126 and capacitors 127 and 128 shape the leading edge of this ten millisecond pulse as required by the 2816 $E^2PROMs$ 50 and 51. This programming pulse is generated when an $E^2PROM$ 50 or 51 is to be erased, and it is generated when a byte of data is to be written to an addressed location in one of the $E^2PROMs$ 50 or 51. It can be appreciated, therefore, that a typical reprogramming sequence includes a bulk erase of each $E^2PROM$ 50 and 51, followed by a sequence of write operations in which new program data is written to successive locations in the $E^2PROMs$ 50 and 51.

The third section of the programming circuit 101 controls the application of negative charging current to the timing capacitor 60 in the programmable cartridge 2. The circuit includes a first switching transistor 130 which controls the application of a minus 5 volt supply to the timing capacitor 60, and a second switching transistor 131 that controls a minus 12 volt supply. The transistors 130 and 131 are driven by the outputs of respective optocouplers 132 and 133 and d.c. power is supplied to the optocouplers 132 and 133 through a third switching transistor 134.

When a control line 135 is enabled, the transistor 134 is turned on and one of the two optocouplers 132 or 133 is energized. When a control line 136 is at a logic low voltage, optocoupler 132 is energized and transistor 130 is turned on to apply the minus 5 volts to the timing capacitor 60 through line 62'. When control line 136 is at a logic high voltage, optocoupler 133 is energized and transistor 131 is turned on to apply the minus 12 volt supply to the timing capacitor 60. The minus 5 volt supply is employed to charge the timing capacitor 60 to a point which enables the programmable cartridge 2 to operate during a test sequence, but does not provide a significant use interval when the cartridge 2 is removed. The minus 12 volt supply is turned on after the test sequence to apply a measured charge to the timing capacitor 60 and to thereby produce a programmed use interval.

Referring particularly to FIGS. 6A–6C, there are a number of alternative embodiments of the vending machine of FIG. 1 which employ the peripheral port. In FIG. 6A, for example, an attract mode unit comprised of a random access memory (RAM) module 200, game unit 201 and CRT display 202 connect to the vending machine peripheral port. A game which is selected by the user is transferred to the RAM module 200 and the game unit 201 is enabled to execute the game program. Preferably, this game program is an "attract mode" version of the game program transferred to the user's programmable cartridge 2. The attract mode program produces images on the CRT display 202 which illustrate the operation of the game and encourage its purchase.

The alternate embodiment shown in FIG. 5B includes a printer interface module 203 connected to the vending machine peripheral port. A small dot matrix printer 204 is driven by the interface module 203 and it is mounted in the vending machine cabinet. When the user pays for and receives a selected program, the printer 204 is operated to provide the user with game instructions and promotional information.

The third embodiment illustrated in FIG. 5C includes a modem module 205 which connects to the peripheral port. The modem module 205 connects to a conventional phone line and it enables the vending machine operator to access data stored in the vending machine memory 75. Such data is illustrated in FIG. 8 which is a map of the accounting data structures stored in the RAM 75. For each game PROM 80–84 currently in use in the vending machine, a two-byte game serial number and a two-byte game use count is stored. As will be explained below, the use count is incremented each time the game program is transferred to a user's programmable cartridge 2 and the value of this count thus provides an accounting figure for the vending machine distributor and the game program copyright owner.

All of the functions performed by the vending machine 1 are under the control of its microprocessor 70. The microprocessor 70 in turn operates under the direction of machine instructions which are stored in the program PROM 71 and which are read out and executed.

Figure 7A:
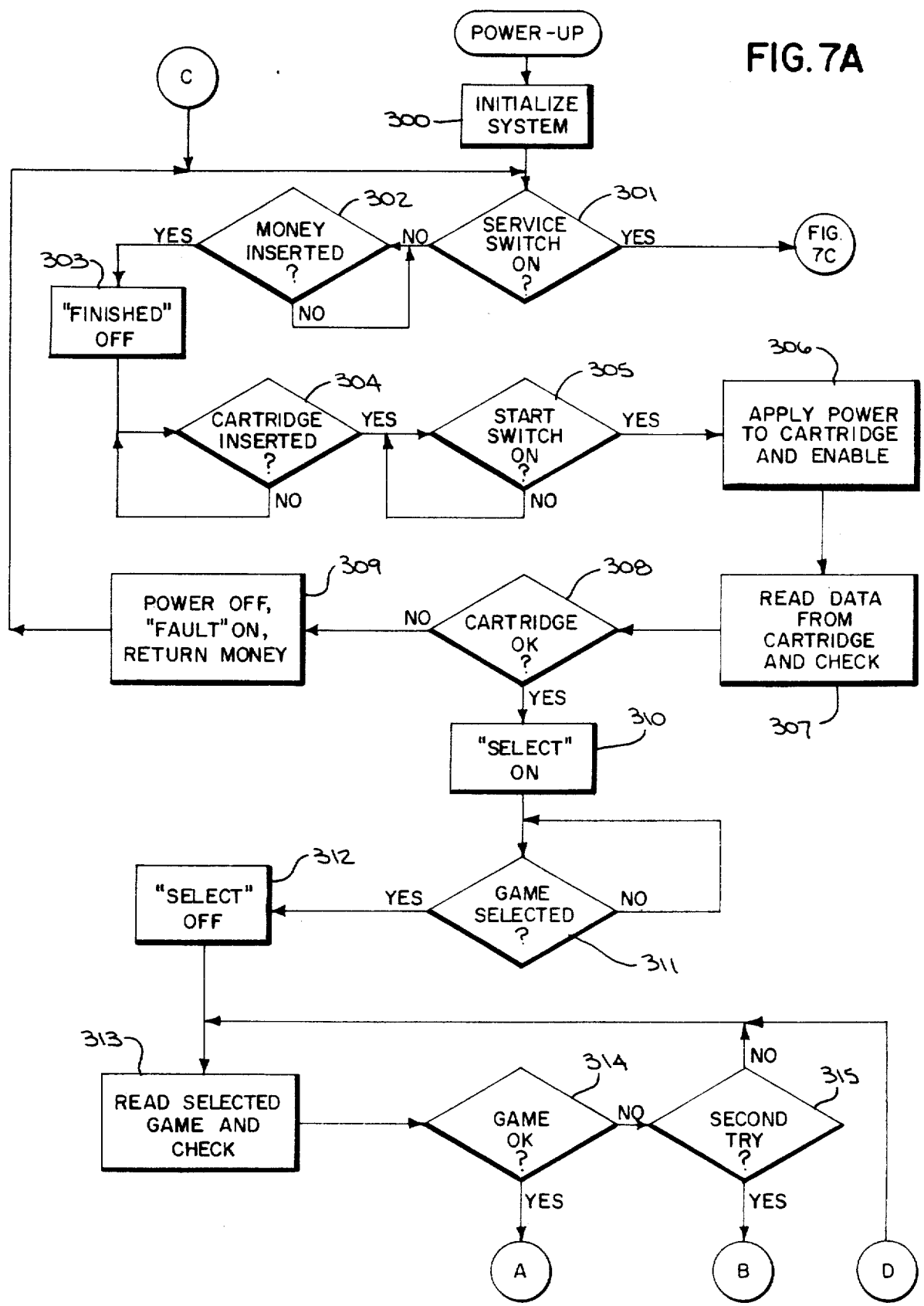
FIGS. 7A–7C are slow charts which illustrate the manner in which the vending machine of FIG. 1 operates.

Referring particularly to FIGS. 1, 4 and 7A, when the vending machine 1 is powered up it executes a set of instructions indicated by process block 300 which initialize both the hardware elements and the data structures stored in the RAM 75. After this initialization is completed, the service switch 110 is checked, and if the service mode is indicated, the system branches at decision block 301. Otherwise, the system waits at decision block 302 for a signal from the coin mechanism 23 that money has been inserted by a user of the machine.

After insertion of money as determined at decision block 302, the integrity of the user's programmable cartridge 2 is checked. First, however, the "finished" lamp 29 is deenergized at 303, the system waits for a programmable cartridge 2 to be inserted at decision block 304, and the system waits for the user to depress the "start" switch 31 at decision block 305. Power is then applied to the user's programmable cartridge 2 at process block 306. This includes the application of the minus 5 volt supply to the use interval circuit in the cartridge 2 as explained above. The program presently stored in the user's cartridge 2 is then read at process block 307 and a check sum number is calculated from this data. The final two bytes read from the cartridge 2 are a check sum number which is compared at decision block 308 with the calculated number. If identity is not found, the user's cartridge 2 is not operating properly and the system branches to a set of instructions indicated by process block 309. Power to the user's cartridge is removed, the "fault" lamp 30 is energized and the coin mechanism 23 is signaled to return the user's money.

If the user's programmable cartridge 2 passes this initial check the "select" lamp 28 is energized as indicated at process block 310. The system then awaits at decision block 311 for one of the select pushbutton switches 12-16 to be depressed. As indicated at process block 312, the "select" lamp 28 is then deenergized and one of the indicator lamps 17-21 is energized to provide visual feedback of the selection to the user. The selected game program is then read from its PROM 80-84 at process block 313 and a check sum number is calculated. If the check sum corresponds with that stored at the end of the game program, the system proceeds. Otherwise, it branches at decision block 314 and checks a flag at decision block 315 to determine if another attempt to read the game program is to be made. If the check sum fails after two attempts, the system branches to "B".

Figure 7B:
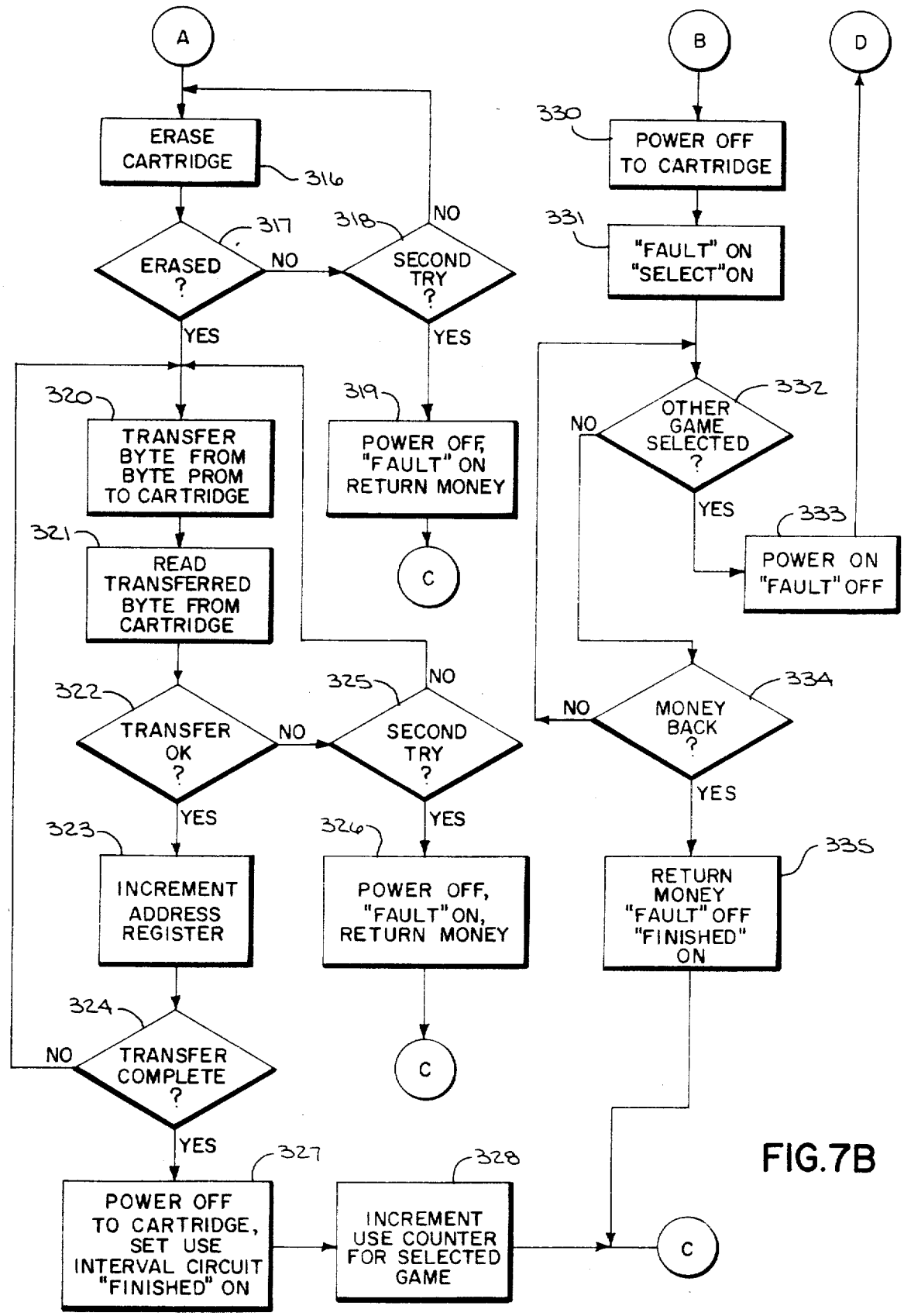

Referring particularly to FIGS. 1, 4 and 7B, when the system is operating properly the next step in the process is to erase the E$^2$PROMs in the user's programmable cartridge 2 as indicated at process block 316. This employs the bulk erase feature discussed above, and after its completion, each line of the E$_2$PROMs is addressed and read to determine if it was property erased (i.e. "FF" hexadecimal). If not, as determined at decision block 317, a second attempt is made. If this second attempt fails as determined at decision block 318, the user's cartridge 2 is faulty and instructions indicated by process block 319 are executed. As indicated above, this failure routine removes power from the programmable cartridge 2, signals a fault and returns the user's money.

If the user's cartridge 2 is properly erased, a loop is entered in which each byte of the selected game program is read from the corresponding game PROM 80-84 and written to the programmable cartridge 2. This transfer of a single byte is indicated by process block 320 and after its completion, the byte is read back from the E$^2$PROM in the programmable cartridge 2 as indicated at process block 321. If the byte was accurately transferred as determined at decision block 322, the address register is incremented at process block 323 to address the next byte and the system loops at decision block 324 to continue the transfer. If the data is not accurately transferred a second attempt is made at decision block 325, and if this fails, a fault is indicated and the user's money is returned as indicated at process block 326.

After the selected game program has been transferred to the user's programmable cartridge 2 power is removed from the cartridge as indicated by process block 327. In addition, the use interval circuit 57 in the programmable cartridge 2 is preset to a one week interval by applying the minus 12 volt charging voltage as described above. After the interval is preset, the "finished" lamp 29 is energized to signal the user that his cartridge 2 can be removed. And finally, as indicated by process block 328, the use counter stored in the RAM 75 is incremented to reflect the fact that a copy of the selected game program has been sold.

When a game program cannot be accurately read as determined at decision blocks 314 and 315 in FIG. 7A, the user is given the opportunity to select another game. Referring to FIG. 7B, power to the user's cartridge 2 is turned off as indicated at process block 330, and the "fault" lamp 30 and "select" lamp 28 are both turned on as indicated at 331. If another game is selected as determined at decision block 332, the system loops after turning off the indicator lamps 28 and 30 and applying power to the user's cartridge at process block 333. The user may not select another game, in which case, the coin mechanism 23 is checked at decision block 334 to determine if the user's money is to be returned. If so, the money is returned at process block 335 and the "finished" lamp 29 is energized before looping to await another customer.

Figure 7C:
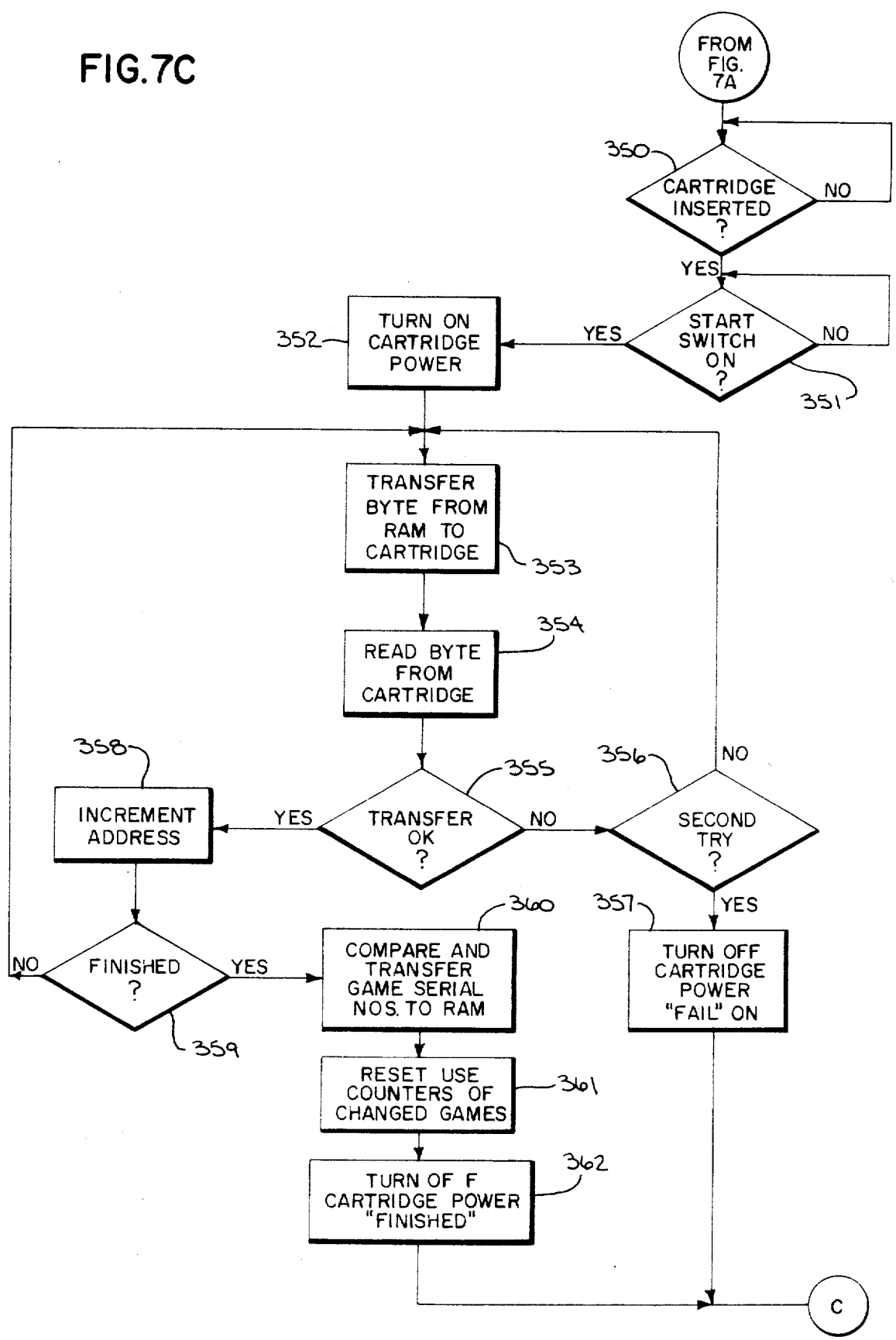

Referring particulary to FIGS. 1, 4 and 7C, when the service mode switch 110 is closed the microprocessor 70 executes an entirely different program. The service man inserts a programmable cartridge 2 into the user connector 2, but rather than receiving game program data, the accounting data stored in the RAM 75 and shown in FIG. 9 is transferred.

Referring to FIG. 7C, the system waits at decision block 350 for the serviceman to insert his programmable cartridge 2. It then waits at decision block 351 for the "start" pushbutton switch 31 to be depressed, and then power is applied to the programmable cartridge at 352. A loop is then entered in which the accounting data is transferred one byte at a time to the user's cartridge 2. More specifically, a byte is transferred at process block 353 and then it is read back from the cartridge 2 at process block 354. If the transfer was not accurate as determined at decision block 355, a second attempt is made to transfer the byte at decision block 356 before indicating a fault at process block 357. Otherwise, the address register is incremented at 358 to address the next byte to be transferred, and the system loops at decision block 359 until all of the data has been transferred. A set of instructions indicated by process block 360 is then executed to read the serial number of each game PROM 80–84 and compare them with the previous serial numbers stored in the accounting table of the RAM 75. If a game cartridge 5–9 has been replaced by the serviceman, the serial number for the new game cartridge(s) is transferred to the accounting table and its corresponding use counter is reset to zero as indicated by process block 361. Power is then removed from the programmable cartridge 2 and the "finished" lamp 29 is energized as indicated at process block 362.

It should be apparent to those skilled in the art that numerous variations are possible to the preferred embodiment described herein without departing from the spirit of the invention. For example, although game programs for video game units are described herein, the invention can be applied to cartridges containing programs designed for general purpose digital computers. Reference is therefore made to the claims which follow for a definition of the scope of the present invention.

I claim:

1. A program vending system for dispensing a program which may be used in a separate programmable machine that executes the program, which comprises:
    memory means for storing a plurality of programs which are each suitable for use in the separate programmable machine;
    transfer means coupled to the memory means for transferring a selected program to a memory device contained in a program cartridge which is removable from the program vending system;
    a use interval circuit contained in the removable program cartridge and coupled to its memory device; and
    use programming means coupled to the transfer means for generating a signal to the use interval circuit in the removable program cartridge which establishes a preset use interval for the transferred program;
    wherein the transferred program stored in the removable program cartridge may be executed in the separate programmable machine until the preset use interval expires and the use interval circuit prevents further execution.

2. The program vending system as recited in claim 1 in which the use interval circuit includes means for measuring time, and it is preset to a time interval by the signal from the use programming means.

3. The program vending system as recited in claim 2 in which the use interval circuit includes a timing capacitor which is charged by the signal from the use programming means and an electronic switch which is coupled to the timing capacitor and to the memory device in the removable program cartridge and is operated thereby when the timing capacitor discharges to an expired state over the time interval to disable said memory device.

4. The program vending system as recited in claim 1 which includes test means coupled to the transfer means for testing the operation of the use interval circuit in the removable cartridge.

5. The program vending system as recited in claim 1 which includes test means for testing the operation of the memory device contained in the removable cartridge to insure that the selected program is accurately transferred.

6. A removable program cartridge for use in a programmable machine which executes a program stored in the removable program cartridge, the combination comprising:
    memory means for storing a set of program instructions which comprise the executable program instructions;
    a connector for making electrical connection to the programmable machine when the removable program cartridge is used by the programmable machine;
    a data bus connected to the memory means and the connector for coupling program instructions read from the memory means to the progrmmable machine when the removable program cartridge is in use;
    a use interval circuit coupled to the memory means, the use interval circuit being operable to disable the coupling of the program instructions to the programmable machine after a preset use interval and to thereby prevent the programmable machine from executing said program after the programmable machine has executed the program a preset amount.

7. The removable program cartridge as recited in claim 6 in which the use interval circuit inhibits the reading of program instructions from the memory means after the preset use interval.

8. The removable program cartridge as recited in claim 6 in which the use interval circuit disables the coupling of the program instructions by disabling a control line which connects to the memory means.

9. The removable program cartridge as recited in claim 6 in which the memory means is an electrically alterable read-only memory device which may be reprogrammed to store a different set of program instructions.

10. The removable program cartridge as recited in claim 6 in which the memory means is a non-volatile reprogrammable device.

11. The removable program cartridge as recited in claim 6 in which the use interval circuit includes timer means which is preset to establish a time interval during which the stored program instructions may be read from the memory means to operate the programmable machine.

12. The removable program cartridge as recited in claim 11 in which the timer means includes a capacitor which is preset with a charge that establishes a voltage level and which includes an electronic switch which is coupled to the capacitor and the memory means and is operated by the voltage level to enable program instructions to be read from the memory means;
    wherein the charge on the capacitor changes over the established time interval to produce a voltage level which operates the electronic switch to terminate the use interval.

13. A machine for vending programs to the memory device in a removable program cartridge which may be disconnected from the vending machine and used in a separate programmable machine that executes a vended program stored therein, the combination comprising:
    a connector for receiving the removable program cartridge and enabling data to be transferred to the memory device therein;
    program storage means for storing a plurality of programs, each suitable for transfer to the removable program cartridge;

selection means coupled to the program storage means for enabling one of the stored programs to be manually selected by a user of the vending machine;

transfer means coupled to the program storage means and the connector for transferring the selected stored program from the program storage means to the memory device in a removable program cartridge which is received in the connector; and use programming means coupled to the connector for conveying use interval information thereto which establishes an interval during which the program transferred to the removable program cartridge may be executed by the separate programmable machine.

14. The vending machine as recited in claim 13 in which the use programming means includes time interval means which is operable to select a time interval during which the transferred program may be used on a separate programmable machine.

15. The vending machine as recited in claim 13 which includes test means coupled to the connector for transferring information from the removable program cartridge received therein, which information indicates if the removable program cartridge is operating properly; and inhibit means coupled to the test means and the transfer means for inhibiting the transfer of a useful program to the removable program cartridge if the removable program cartridge is not operating properly.

16. The vending machine as recited in claim 13 which includes storage means coupled to the transfer means for storing data which indicates the extent to which each program stored in the program storage means is selected and transferred to a removable program cartridge.

17. The vending machine as recited in claim 13 which includes program directions storage means coupled to the selection means, and display means coupled to the program directions storage means for providing visual information to the user of the vending machine;

wherein data which provides the user with direction information associated with a selected program is transferred to the display means.

18. The vending machine as recited in claim 13 in which the programs stored in the program storage means each include a set of instructions which may be executed to preview the operation of each program and in which the vending machine includes:

programmable processor means coupled to the program storage means and to the selection means for executing the preview instruction set in a selected program; and display means coupled to the programmable processor means for displaying information to the user when a selected preview instruction set is executed.

* * * * *